United States Patent

[11] 3,632,394

[72] Inventor Roger Garnier
Lyon, France
[21] Appl. No. 836,995
[22] Filed June 26, 1969
[45] Patented Jan. 4, 1972
[73] Assignee Rhone-Poulenc S.A.
Paris, France
[32] Priority June 28, 1968
[33] France
[31] 157171

[54] PAINTING MOIST PLASTER
13 Claims, No Drawings

[52] U.S. Cl........................................... 117/72,
117/2 R, 117/54, 117/123 D, 117/161 UC
[51] Int. Cl........................................ B44d 1/14,
B44d 1/20

[50] Field of Search............................................ 117/123 D,
123 C, 72, 161 UC 54

[56] References Cited
UNITED STATES PATENTS

| | | | |
|---|---|---|---|
| 2,065,069 | 12/1936 | Hadden........................ | 117/123 X C |
| 2,973,285 | 2/1961 | Berke et al.................... | 117/123 X D |
| 3,219,729 | 11/1965 | Meyers et al. ................ | 117/161 X UC |
| 3,305,387 | 2/1967 | Fraser et al.................... | 117/123 D |

*Primary Examiner*—William D. Martin
*Assistant Examiner*—Ralph Husack
*Attorney*—Cushman, Darby & Cushman

ABSTRACT: This invention provides a process for preventing blisters forming in water vapor-permeable paint applied to moist plaster using as undercoat a solution of a vinyl chloride copolymer.

PAINTING MOIST PLASTER

The present invention relates to preventing blisters forming in paint applied to plaster of high moisture content.

It is known (Travaux de Peintune 21 No. 10th Oct. 1966, p. 334) that numerous paints based on aqueous dispersions of polymers, especially vinyl polymers, give microporous films which do not impede the "breathing" of the substrates and which, while providing immediate protection against water entering from outside, allow the residual moisture in the substrate to escape without causing blistering of the film.

The same result is achieved with paints in the form of solutions provided that the concentration of pigment by volume (CPV) in these paints (defined as the ratio of volume of pigments and fillers × 100/volume of pigments and fillers + volume of the polymer) is greater than the critical CPV (threshold concentration of pigments beyond which there is no longer sufficient binder to fill the interstices between the particles of pigments and fillers). The process of the invention only relates to such water vapor-permeable paints.

It is however known that it is generally inadvisable to apply paint to a plaster containing more than 5 to 6 percent of moisture because of the lack of anchoring of the paints to the excessively moist plaster and the blisters which form as a result. Finally, it is known that the drying of plaster is a slow process and that it is necessary to wait several months for it to be complete, and this delays the finishing of the work.

It is also known that it is often necessary to repair the surface of the plaster before applying the paint as because of various causes such as damage by tools, the plaster may be bumpy or irregular. To make the surface to be painted as perfectly smooth as possible, a pasty preparation applied by a knife, usually called "stopping coating" or "painter's coating," is used. However it has been found that the coatings usually applied to dry plaster are unsuitable for work on a surface with a high moisture content.

The present invention provides a means of preventing blisters forming in paint applied to a plaster which can contain more than 5 percent of water. In particular the present invention provides a process for applying an undercoat to moist plaster which comprises applying to said plaster a solution of a copolymer of vinyl chloride, at least one ethylenically unsaturated carboxylic acid ester and optionally a small proportion of at least one ethylenically unsaturated acid.

If the surface of the plaster has to be repaired, the process of the invention comprises in addition applying a stopping coating in which the binder consists of an aqueous emulsion of a copolymer of vinyl chloride and butyl maleate, this coating being applied either before or after the anchoring undercoat.

The anchoring undercoat of this invention possesses advantageous characteristics in respect of film-forming, water vapor permeability, insensitivity to water, adhesion to plaster and compatibility with water vapor permeable paints.

The copolymer constituting the undercoat is generally prepared with the following proportions of monomers (by weight): (a) 30 to 92 percent of vinyl chloride; (b) 8 to 70 percent of one or more ethylenically unsaturated copolymerizable esters; and (c) 0 to 4 percent of one or more aliphatic ethylenically unsaturated acids containing three to six carbon atoms.

The esters copolymerizable with vinyl chloride include vinyl esters of saturated aliphatic straight chain monocarboxylic acids such as vinyl acetate, vinyl propionate, vinyl laurate and vinyl stearate, vinyl esters of saturated aliphatic monocarboxylic acids in which the carboxyl groups are bonded to tertiary and/or quaternary carbon atoms and the esters of ethylenically unsaturated monoacids and diacids containing 3 to 6 carbon atoms such as methyl, ethyl, propyl or butyl acrylate, methacrylate, maleate or fumarate. The proportion of these esters in the copolymers preferably varies from 15 to 60 percent, with the amount of vinyl chloride preferably varying from 40 to 85 percent.

The ethylenically unsaturated aliphatic acids which may be present in the copolymers may be monoacids such as acrylic, methacrylic or crotonic acid or diacids such as maleic, fumaric or itaconic acid.

It is not essential that the copolymer constituting the undercoat should contain the acid if the plaster on which the undercoat is deposited contains little water; but when one is dealing with a very moist plaster (more than 10 percent of water) it is advantageous to use as the undercoat a copolymer containing up to 4 percent, generally 0.5 to 1.5 percent by weight of such an acid.

The concentration of the copolymer solution may vary from 5 to 30 percent, preferably from 10 to 20 percent, by weight. Obviously compounds which are of low volatility, unstable or prone to react with the copolymer, the substrate or the paint which will subsequently be applied, are not used as solvents. Apart from these precautions and taking into account the nature and proportions of the copolymerized monomers, the solvent may be one or more hydrocarbons (optionally chlorinated), alcohols, esters, ethers, or ketones or a mixture of such solvents. To obtain such a solution the monomers may be copolymerized directly in the chosen solvent or the copolymers may be prepared by processes other than solution polymerization (for example suspension polymerization or emulsion polymerization) and then the solutions prepared in a second stage. If the solutions are not prepared directly, it is also possible either, where such an operation is feasible, to isolate the copolymers and to dry them and dissolve them in the chosen solvent, or to go directly from the emulsion or suspension to the solution, for example by following the procedure described in French Pat. specification No. 1,410,277.

Several methods of preparing vinyl chloride copolymers are well known and have been described in the literature.

The anchoring undercoat can be applied by various methods well known to building technicians, such as by brush, roller or spraying.

After the solution previously described has been applied to the plaster, the solution is allowed to dry. The drying time varies depending on the nature of the solvent, the temperature and the relative atmospheric humidity but if the ambient temperature is about 20° C. and the relative atmospheric humidity about 50 percent, it is generally 1 to 3 hours.

The stopping coating which may be used if the surface of the plaster is not regular comprises an aqueous emulsion of a vinyl chloride/butyl maleate copolymer to which one or more fillers and optionally adjuvants usually employed in the manufacture of coatings have been added.

More precisely the stopping coating used in this invention is one in which the binder is an aqueous emulsion of a vinyl chloride/butyl maleate copolymer, which contains 45 to 60 percent, preferably 50 to 57 percent, of butyl maleate by weight, and has a reduced viscosity of 10 to 60 ml./g. at 25° C. for a solution containing 5 g./l. of cyclohexanone. The coating generally contains (by weight): (a) 4 to 10 percent of copolymer in the form of particles having a mean apparent diameter of less than 5 $\mu$ and preferably less than 2 $\mu$; (b) 60 to 76 percent of fillers; and (c) 20 to 30 percent of water.

Once the coating has been applied to the substrate, generally using a knife, it is left to dry. The drying time varies depending especially on the temperature and the relative atmospheric humidity. If the temperature is about 20° C. and the relative atmospheric humidity about 50 percent, it is generally 1 to 3 hours.

The surface of the plaster to which either only the anchoring undercoat, or the said undercoat and the said stopping coating, have been applied is suitable for covering with one or more layers of a water vapor-permeable paint.

The latter, like the undercoat and coating, is preferably insensitive to water. Various paints based on vinyl or acrylic homopolymer or copolymer emulsions are suitable. Aqueous dispersions of copolymers of styrene or vinyl toluene with butadiene may also be used. Water vapor-permeable solution paints can also be used. A paint prepared from an aqueous dispersion of a vinyl chloride/butyl maleate copolymer, such as described in French Pat. specification No. 1,517,927, can advantageously be used.

As has been stated above, the process of the invention enables a plaster which has previously been considered unsuitable for painting because it contains too much moisture to be painted. The process of the invention therefore results in a considerable saving of time. It also makes it possible to realize the advantageous properties of various paints based on synthetic polymers, especially in aqueous dispersions, which when used directly on moist plaster give only mediocre results, but which, when employed in accordance with this invention, give coatings of excellent quality which are in particular insensitive to the gradual evaporation of the water in the plaster.

The following examples illustrate the process of the invention.

The coatings produced in accordance with the invention were subjected to a blistering resistance test. The method described below enables a quick assessment of the behavior of a paint applied to moist plaster to be made.

22×11×1 cm. plaster plates are prepared from a mixture containing 100 parts by weight of plaster powder and 80 parts by weight of water. The plates are removed from the mould about 30 minutes after casting and then dried and weighed. When the plates still contain 15 percent of water (calculated relative to the weight of dry hydrated plaster) the paint system (undercoat/coating/paint) to be tested is applied, taking care to cover the two faces and the sides well. When the paint has dried, the plaster is again weighed. When a constant weight (complete drying) has been attained, the actual blistering test is carried out.

A slight incision is made in the bottom of the plates and the plates are then placed vertically in a receptacle containing water to a depth of about 2 cm. After 4 hours steeping, the plates are removed and it is confirmed by weighing, that they are fully impregnated with water, i.e., they will not absorb any more water. They have taken up about 50 percent of water, based on the weight of dry plaster, and the appearance of blisters is examined. The plates are then left at ambient temperature open to the atmosphere for one week.

Further steeping-drying cycles are then carried out. The behavior of the paint after four cycles is believed to give a valid idea of what would be the behavior of the paint on a very moist plaster under actual use conditions.

EXAMPLE 1

A series of tests is carried out with two types of paints.

Paint (A) is prepared according to the data of example 1 of French Pat. specification No. 1,517,917. The binder is an aqueous dispersion containing 50 percent by weight of a vinyl chloride/butyl maleate copolymer in which the copolymer contains 45 percent of vinyl chloride and 55 percent of butyl maleate. The ratio of pigment to binder in this paint is 2.5 : 1 by weight and the pigment concentration is 54 percent by volume.

Paint (B) is prepared from an aqueous dispersion of a vinyl acetate/butyl maleate (weight ratio 70/30) copolymer. The ratio of pigments to binder is again 2.5 : 1.

The undercoat is produced from a 15 percent solution in ethyl acetate of a vinyl chloride/butyl maleate/maleic acid (74/25/1 percent by weight) copolymer, applied by the method described above, and the condition of the surface of the plates is observed after 1, 2, 3 and 4 steeping-drying cycles.

The table below shows the observations made on the surface condition of the plates to which the undercoat has previously been applied, and, for comparison, plates which have not been treated with an undercoat.

The surface condition is rated to be:
Excellent, if there are no blisters;
Acceptable, if several blisters are observed;
Mediocre, if numerous blisters are formed; or
Very bad, if the support is damaged.

This table clearly shows the value of the undercoat.

If the vinyl chloride/butyl maleate/maleic acid copolymer undercoat is replaced by a vinyl acetate/butyl maleate copolymer undercoat, the following is observed,

| Test | Paint | Surface condition after— | | | |
|---|---|---|---|---|---|
| | | 1 cycle | 2 cycles | 3 cycles | 4 cycles |
| 1 | A | Excellent | Excellent | Acceptable | Mediocre. |
| 2 | B | do | Acceptable | Mediocre | Do. |

EXAMPLE 2

To assess the influence of the stopping coating, a series of tests is carried out on plaster plates such as those described above to which the paint "A" or "B" is applied (optionally after application of a vinyl chloride/butyl maleate/maleic acid copolymer undercoat), with some plates having been also covered by a layer of stopping coating.

The coating ($E_1$) used is prepared from a 50 percent aqueous emulsion of a vinyl chloride/butyl maleate (in the ratio of 45/55) copolymer and contains the following per 100 g. of copolymer:

| | |
|---|---|
| Calcium carbonate (trademark "OMYA Violet Label"; 95 percent <10 $\mu$, 60 percent <3 $\mu$) | 400 g. |
| Calcium carbonate (trademark "Durcal 40"; 2-200 $\mu$) | 500 g. |
| Fine silica (less than 5 $\mu$) | 60 g. |
| Calcium magnesium carbonate (dolomite) (<20 $\mu$) | 300 g. |
| 2 percent aqueous solution of hydroxyethylcellulose, of viscosity 25,000 cPo at 25° C. | 400 g. |
| "Scurol C" (nonionic wetting agent produced by condensation of ethylene oxide with an aromatic radical) | 6 g. |
| 10 percent aqueous solution of sodium pentachlorophenate | 20 g. |
| 10 percent aqueous solution of sodium hexametaphosphate | 2 g. |

For comparison, a second coating ($E_2$) is prepared containing the same fillers in the same proportions, but starting from an emulsion of a vinyl acetate/butyl maleate (ratio 70/30) copolymer.

The following observations were made after steeping/drying cycles.

| Test | Paint | Undercoat | Surface condition after— | | | |
|---|---|---|---|---|---|---|
| | | | 1 cycle | 2 cycles | 3 cycles | 4 cycles |
| 1 | A | Yes | Excellent | Excellent | Excellent | Excellent. |
| 2 | B | Yes | do | do | do | Acceptable. |
| 3 | A | No | do | do | Acceptable | Mediocre. |
| 4 | B | No | Acceptable | Mediocre | Mediocre | Do. |

| Test | Coating | Undercoat | Paint | Surface condition after— | | | |
|---|---|---|---|---|---|---|---|
| | | | | 1 cycle | 2 cycles | 3 cycles | 4 cycles |
| 1 | $E_1$ | Yes | A | Excellent | Excellent | Excellent | Excellent. |
| 2 | $E_1$ | Yes | B | do | do | do | Acceptable. |
| 3 | $E_1$ | No | A | Acceptable | Mediocre | Mediocre | Mediocre. |
| 4 | $E_1$ | No | B | Mediocre | do | do | Do. |
| 5 | $E_2$ | Yes | A | Acceptable | do | do | Do. |
| 6 | $E_2$ | Yes | B | Mediocre | do | do | Do. |
| 7 | $E_2$ | No | A | do | do | Very bad | Very bad. |
| 8 | $E_2$ | No | B | do | do | do | Do. |

EXAMPLE 3

The procedure of examples 1 and 2 is followed with paint "A" only except that the undercoat (vinyl chloride/butyl maleate/maleic acid, 74/25/1) is replaced by the following undercoats:

a. 15 percent solution of a vinyl chloride/butyl maleate/maleic acid (84/15/1) copolymer in ethyl acetate.
b. 10 percent solution of a vinyl chloride/vinyl propionate (70/30) copolymer in ethyl acetate.
c. 15 percent solution of a copolymer of vinyl chloride with vinyl esters of branched $C_9$ to $C_{11}$ aliphatic monocarboxylic acids, sold commercially under the trade name "Vinyl Versatate (VeOVa 911)" (40-60) in "SOLVESSO 100" (Mixture of benzene hydrocarbons produced by the distillation of petroleum).

Where a coating is used, it is the coating $E_1$ described in example 2.

The following table shows the observations made after various steeping/drying cycles.

| Test | Coating | Undercoat | Surface condition after— | | | |
|---|---|---|---|---|---|---|
| | | | 1 cycle | 2 cycles | 3 cycles | 4 cycles |
| 1 | No | a | Excellent | Excellent | Excellent | Excellent. |
| 2 | No | b | do | do | do | Do. |
| 3 | No | c | do | do | do | Do. |
| 4 | Yes | a | do | do | do | Do. |
| 5 | Yes | b | do | do | do | Do. |
| 6 | Yes | c | do | do | do | Do. |

We claim:

1. A process for applying an undercoat to moist plaster which comprises applying to said plaster an organic solvent solution of a copolymer comprising 30 to 92 percent by weight of vinyl chloride, 8 to 70 percent by weight of ethylenically unsaturated carboxylic acid ester and 0 to 4 percent by weight of an aliphatic ethylenically unsaturated carboxylic acid containing three to six carbon atoms and allowing the copolymer solution to dry.

2. A process according to claim 1 which comprises applying before the application of the undercoat in addition, as a stopping coating, an aqueous emulsion of vinyl chloride/butyl maleate copolymer comprising 45 to 60 percent by weight butyl maleate and having a reduced viscosity of 10 to 60 ml./g. at 25° C. for a solution containing 5 g./l. of cyclohexanone and one or more fillers and allowing the stopping coating to dry.

3. A process according to claim 2 wherein the emulsion used as stopping coating comprises 4 to 10 percent by weight of copolymer, 60 to 76 percent by weight of filler and 20 to 30 percent by weight of water.

4. A process according to claim 1 which comprises applying after the application of the undercoat in addition, as a stopping coating, an aqueous emulsion of vinyl chloride/butyl maleate copolymer comprising 45 to 60 percent by weight butyl maleate and having a reduced viscosity of 10 to 60 ml./g. at 25° C. for a solution containing 5 g./l. of cyclohexanone and one or more fillers and allowing the stopping coating to dry.

5. A process according to claim 4 wherein the emulsion used as stopping coating comprises 4 to 10 percent by weight of copolymer, 60 to 76 percent by weight of filler and 20 to 30 percent by weight of water.

6. A process according to claim 1 wherein the plaster contains more than 5 percent of water based on the weight of the dry plaster.

7. A process according to claim 1 wherein the concentration of the copolymer solution is 5 to 30 percent.

8. A process according to claim 1 wherein the copolymer contains 40 to 85 percent of vinyl chloride and 60 to 15 percent of the ester.

9. A process according to claim 1 wherein the copolymer contains 0.5 to 1.5 percent acid.

10. A process according to claim 1 wherein the ester is vinyl acetate, vinyl propionate, vinyl stearate or methyl, ethyl, propyl or butyl acrylate, methacrylate, maleate or fumarate.

11. A process according to claim 1 wherein the acid, if present, is acrylic, methacrylic, crotonic, maleic, fumaric or itaconic.

12. A process according to claim 1 wherein the copolymer comprises 74 percent by weight vinyl chloride, 25 percent butyl maleate and 1 percent by weight maleic acid, or 84 percent by weight vinyl chloride 15 percent by weight butyl maleate and 1 percent by weight maleic acid, or 70 percent by weight vinyl chloride and 30 percent by weight vinyl propionate, or 40 percent by weight vinyl chloride and 60 percent by weight of one or more vinyl esters of saturated aliphatic monocarboxylic acid having nine to 11 carbon atoms.

13. A process for painting moist plaster which comprises first applying to said plaster an organic solvent solution of a copolymer comprising 30 to 92 percent by weight of vinyl chloride, 8 to 70 percent by weight of ethylenically unsaturated carboxylic acid ester and 0 to 4 percent by weight of an aliphatic ethylenically unsaturated carboxylic acid, allowing the copolymer solution to dry, and then applying a water vapor permeable paint.

* * * * *